United States Patent
Hisagi et al.

(10) Patent No.: US 9,430,363 B1
(45) Date of Patent: Aug. 30, 2016

(54) CREATING EXPECTED TEST RESULTS USING PREVIOUS TEST RESULTS

(71) Applicant: International Business Machines Corporation, Armonk, NY (US)

(72) Inventors: Sakura B. Hisagi, Yamato (JP); Yusuke Nishitani, Tokyo (JP); Yoshinori Tahara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/980,012

(22) Filed: Dec. 28, 2015

(51) Int. Cl.
G06F 9/44 (2006.01)
G06F 11/36 (2006.01)
G06F 7/02 (2006.01)
G06F 7/24 (2006.01)

(52) U.S. Cl.
CPC ............. *G06F 11/3692* (2013.01); *G06F 7/02* (2013.01); *G06F 7/24* (2013.01)

(58) Field of Classification Search
CPC .................................................. G06F 11/3692
See application file for complete search history.

(56) References Cited

U.S. PATENT DOCUMENTS

| | | | | |
|---|---|---|---|---|
| 6,229,922 | B1 * | 5/2001 | Sasakawa ................. | G06F 7/02 382/209 |
| 6,986,125 | B2 * | 1/2006 | Apuzzo ............... | G06F 11/3696 714/38.13 |
| 8,087,088 | B1 * | 12/2011 | Pennington ......... | G06F 11/3692 709/206 |
| 2003/0212712 | A1 * | 11/2003 | Gu .................... | G06F 17/30067 |
| 2005/0102323 | A1 * | 5/2005 | Henderson .......... | G06F 11/3692 |
| 2006/0026413 | A1 * | 2/2006 | Ramkumar ............... | G06F 7/02 712/300 |
| 2012/0166879 | A1 * | 6/2012 | Watanabe ........... | G06F 11/0751 714/37 |
| 2012/0253728 | A1 | 10/2012 | Chamas et al. | |
| 2013/0117609 | A1 * | 5/2013 | Dande ................. | G06F 11/3692 714/32 |
| 2013/0185056 | A1 | 7/2013 | Ingram et al. | |
| 2014/0359581 | A1 | 12/2014 | Soshin | |

FOREIGN PATENT DOCUMENTS

JP 2009122970 A 6/2009

OTHER PUBLICATIONS

Author Unknown, "Lecture 25: Longest Common Subsequence", Nov. 27, 2011, accessed online at <web.archive.org/web/20111027141408/http://www.cs.umd.edu/~meesh/351/mount/lectures/lect25-longest-common-subseq.pdf>.*

(Continued)

*Primary Examiner* — James D Rutten
(74) *Attorney, Agent, or Firm* — Alexander G. Jochym

(57) ABSTRACT

One or more previous actual results are retrieved from a software test. The longest common subsequence of data of the one or more previous actual results is determined. The longest common subsequence of data is removed to create remaining common data. The remaining common data is classified resulting in a matched portion of data and an unmatched portion of data. Classification is done by dynamic programming. Matched portions of data are identical. Unmatched portions of data are different. If an existing class exists, unmatched portions of the remaining common data are applied to the existing class. A new class of data is created. The unmatched portions of the remaining common data not applied to an existing class is applied to the new class. An expected test result is created using the longest common subsequence of data, the matched portions of the common data, and the classified common data.

20 Claims, 7 Drawing Sheets

(56) References Cited

OTHER PUBLICATIONS

Author Unknown, "Dynamic Programming | Set 4 (Longest Common Subsequence)", Jan. 1, 2013, accessed online at <web.archive.org/web/20130101203615/http://www.geeksforgeeks.org/dynamic-programming-set-4-longest-common-subsequence>.*

Author Unknown, "Dynamic Programming | Set 1 (Overlapping Subproblems Property)", Jan. 1, 2013, accessed online at <web.archive.org/web/20130101203615/http://www.geeksforgeeks.org/dynamic-programming-set-1>.*

* cited by examiner

CREATING EXPECTED TEST RESULTS USING PREVIOUS TEST RESULTS

BACKGROUND OF THE INVENTION

The present invention relates generally to the field of software testing, and more particularly to using previous test results to create expected test results for testing software.

A primary purpose of software testing is to detect software failures so that defects may be discovered and corrected. Software testing cannot establish that a product functions properly under all conditions but can only establish that it does not function properly under specific conditions (i.e., test cases). The scope of software testing often includes examination of code as well as execution of that code in various environments and conditions as well as examining the aspects of code. In other words, does it do what it is supposed to do and do what it needs to do.

SUMMARY

Embodiments of the present invention include a method, computer program product, and system for using previous test results to create expected test results for testing software. In one embodiment, one or more previous actual results are retrieved from a software test. The longest common subsequence of data of the one or more previous actual results is determined. The longest common subsequence of data is removed to create remaining common data. The remaining common data is classified resulting in a matched portion of data and an unmatched portion of data. Classification is done by dynamic programming. Matched portions of data are identical. Unmatched portions of data are different. If an existing class exists, unmatched portions of the remaining common data are applied to the existing class. A new class of data is created. The unmatched portions of the remaining common data not applied to an existing class is applied to the new class. An expected test result is created using the longest common subsequence of data, the matched portions of the common data, and the classified common data.

DETAILED DESCRIPTION

Some embodiments of the present invention recognize that software testing may require a large investment in time and resources. Test developers create "expected" test results for a given test case, run the program using the parameters of the test case and verify the actual test results of the run by comparing those results to the expected test results. A person doing a visual comparison of data files may do the comparison of the actual test results to the expected test results.

Embodiments of the present invention recognize that there may be a method, computer program product, and system for using previous test results to create expected test results for testing software. In an embodiment, using previous test results to create the expected test results yields better accuracy for the expected test results. The visual comparison of the actual to expected test results may be simplified by classifying common portions of the results data such that those common portions may be ignored in the comparison.

Figure 1:
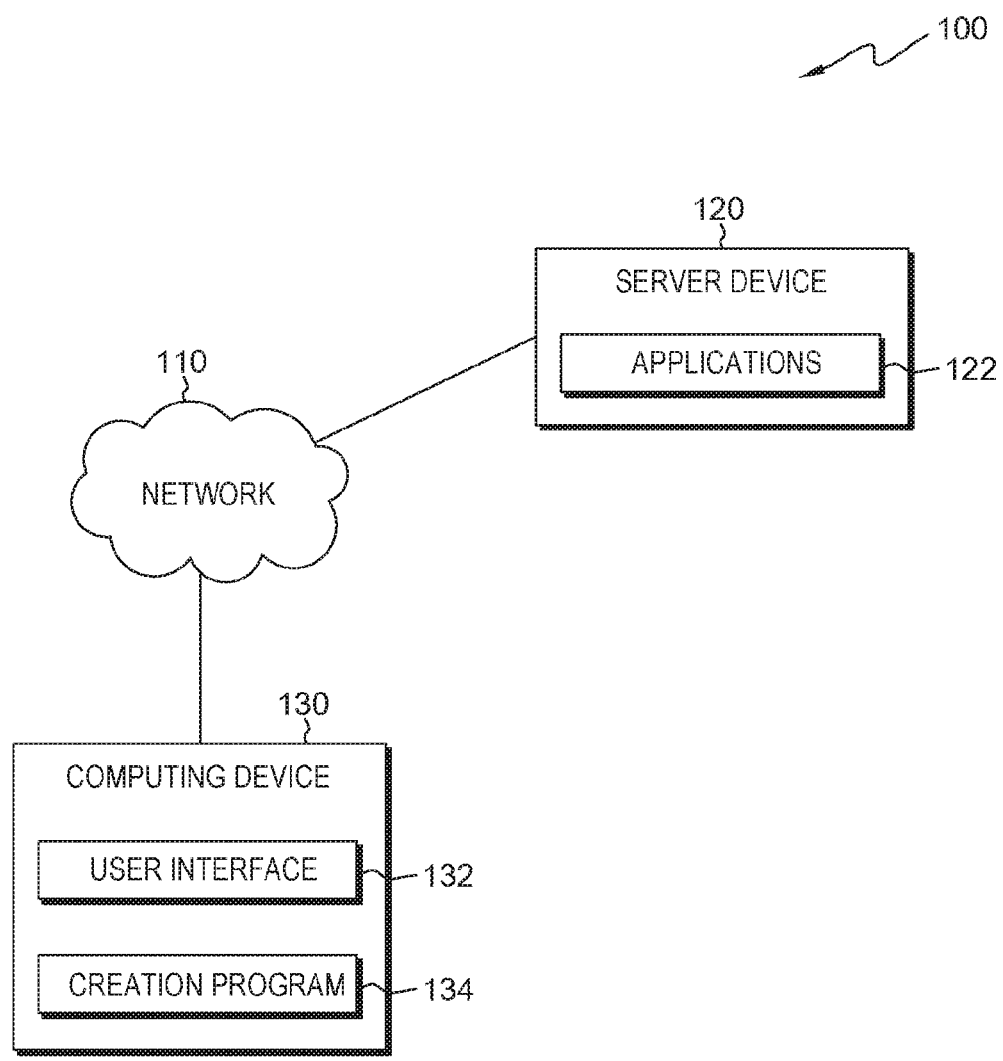
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes server device 120 which includes applications 122. Computing environment 100 also includes computing device 130 which includes user interface 132 and creation program 134. Server device 120 and computing device 130 are interconnected via network 110. In example embodiments, computing environment 100 may include other computing devices not shown such as smartwatches, cell phones, smartphones, phablets, tablet computers, laptop computers, desktop computers, other computer servers or any other computer system known in the art, interconnected with server device 120 and computing device 130 over network 110.

In example embodiments, server device 120 and computing device 130 may connect to network 110 which enables computing device 130 to access other computing devices and/or data not directly stored on computing device 130. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between server device 120, computing device 130, and other computing devices (not shown) within computing environment 100, in accordance with embodiments of the present invention.

In embodiments of the present invention, server device 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. Computing environment 100 may include any number of server device 120. Server device 120 may include components as depicted and described in further detail with respect to FIG. 3, in accordance with embodiments of the present invention. Computing device 130 is substantially similar to server device 120.

In an embodiment, applications 122 may be a software program or programs designed to carry out operations to complete a specific task. A program is a sequence of instructions written by a programmer to perform a specific task. In various embodiments, applications 122 may be a word processor, a spreadsheet system, a database, a smartphone game, an e-mail system, a calendar system, etc. Applications 122 cannot run on itself but is dependent on system software (not shown) to execute. The system software serves the application, which in turn serves the user.

According to embodiments of the present invention, computing device 130 includes user interface 132 and creation program 134.

In an embodiment, user interface 132 provides an interface between a user of computing device 130, network 110 and any other devices connected to network 110. User interface 132 allows a user of computing device 130 to interact with the W3 and also enables the user to receive an indicator of one or more previous viewing locations and a summary of viewing history. In general, a user interface is the space where interactions between humans and machines occur. User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between a user of computing device 130 and network 110. Mobile application software, or an "app," is a computer program designed to run on smartphones, phablets, tablet computers and other mobile devices.

In embodiments of the present invention, creation program 134 may be a program, subprogram of a larger program, application, plurality of applications or mobile application software which functions to use previous test results to create expected test results for testing software. Mobile application software, or an "app," is a computer program designed to run on smartphones, phablets, tablet computers and other mobile devices. In one embodiment, creation program 134 functions as a stand-alone program residing on computing device 130. In another embodiment, creation program 134 may be included as a part of an operating system (not shown) of computing device 130. In yet another embodiment, creation program 134 may work in conjunction with other programs, applications, etc., found on computing device 130 or in computing environment 100. In yet another embodiment, creation program 134 may be found on server device 120 or other computing devices (not shown) in computing environment 100 which are interconnected to computing device 130 via network 110.

According to embodiments of the present invention, creation program 134 uses previous actual test results to create a set of expected test results for a new test of a given software application. Creation program 134 also classifies common portions of the results data such that those common portions may be ignored in the comparison of the new (actual) test results to the created, expected test results.

Figure 2:
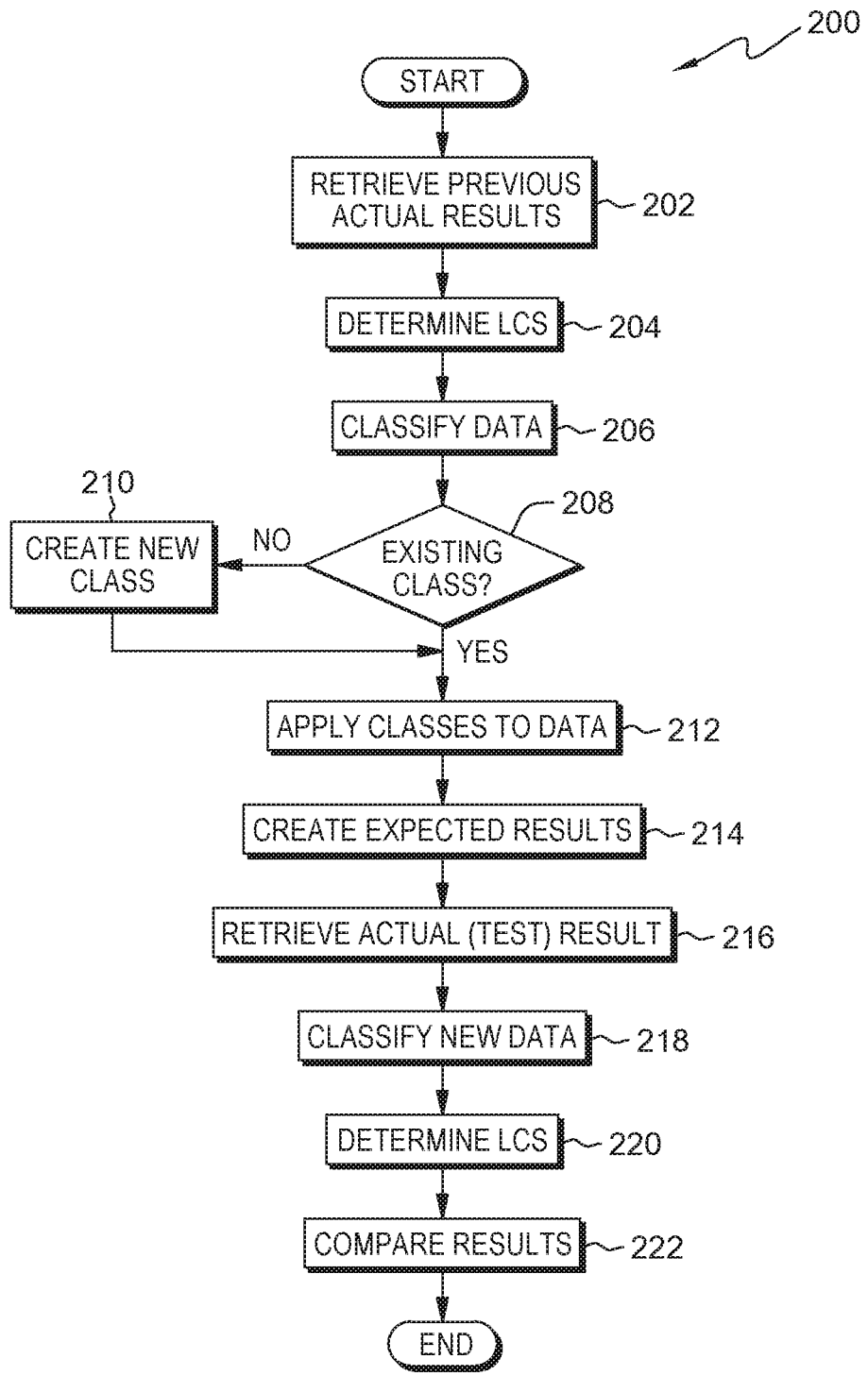
FIG. 2 is a flowchart depicting operational steps of a program that functions to use previous test results to create expected test results for testing software, in accordance with an embodiment of the present invention.

FIG. 2 is a flowchart of workflow 200 representing operational steps for using previous test results to create expected test results for testing software. In one embodiment, creation program 134 performs the operational steps of workflow 200. In an alternative embodiment, any other program, while working with creation program 134, may perform the operational steps of workflow 200. In an embodiment, creation program 134 may invoke operational steps of workflow 200 upon the request of a user. In an alternative embodiment, creation program 134 may invoke operational steps of workflow 200 automatically when two or more test results are available. In an embodiment, any of the operational steps may be performed in any order.

Figure 3A:
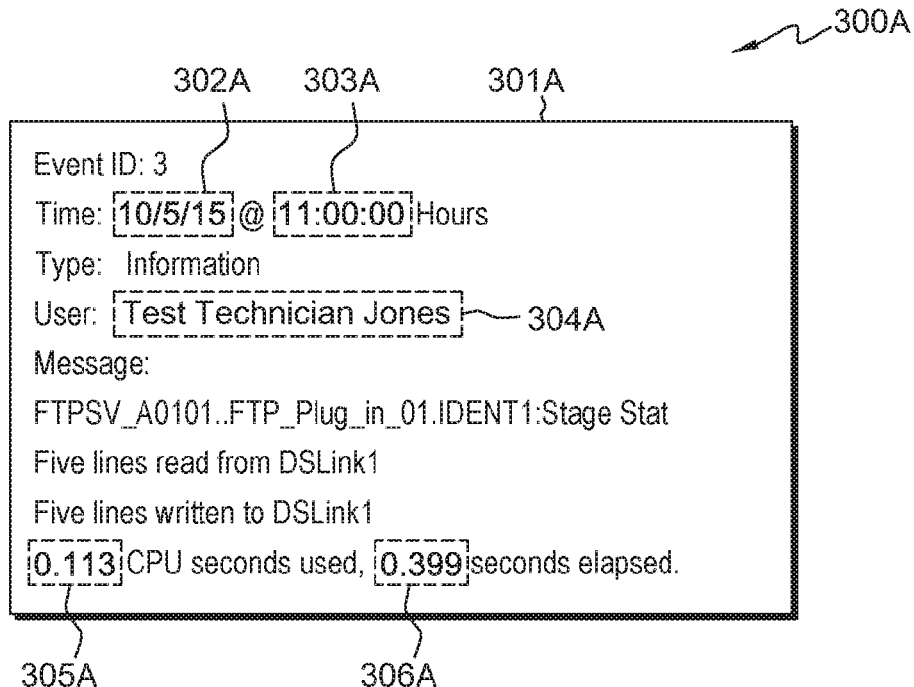
FIG. 3A, FIG. 3B, and FIG. 3C are examples of previous, actual test results, in accordance with an embodiment of the present invention.
Figure 3B:
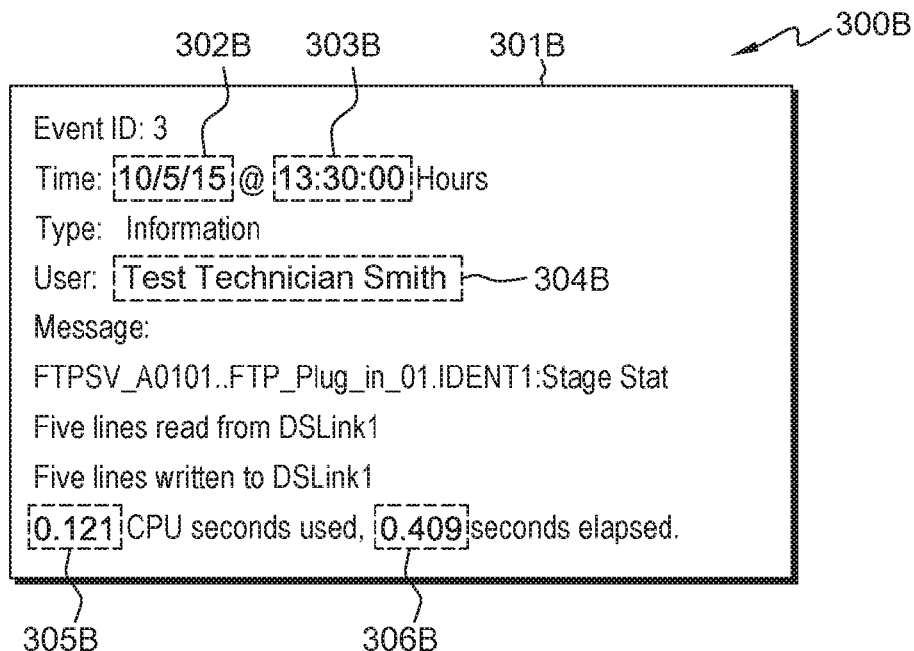
Figure 3C:
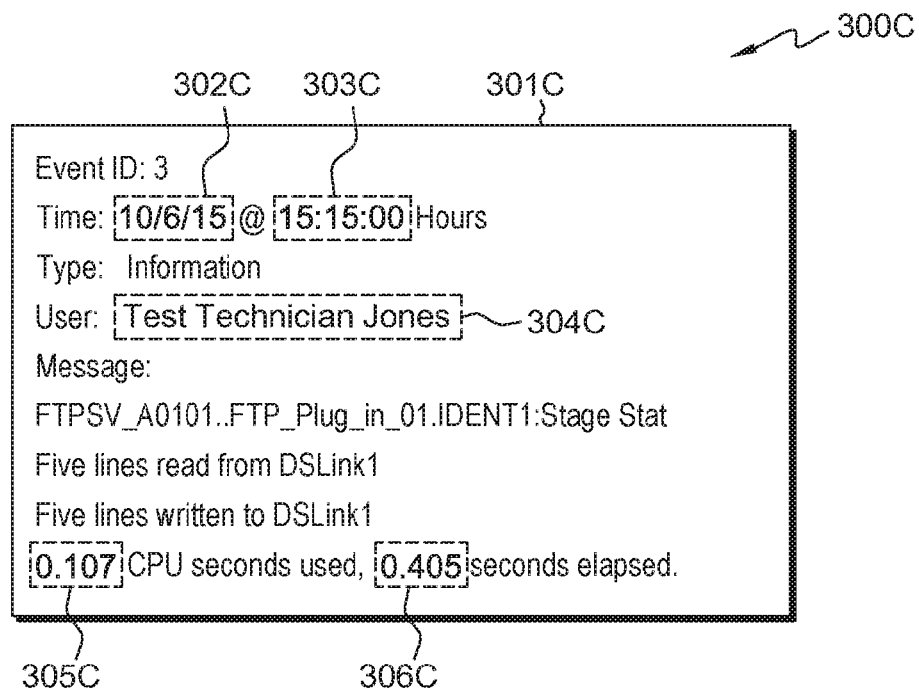

In an embodiment, creation program 134 retrieves previous actual results (step 202). In other words, creation program 134 retrieves the previous actual test results for testing a given application. The previous actual test results are the earlier test results from performing a test (e.g., verification test, performance test, validation test, etc.) on a given application. According to an embodiment of the present invention, creation program 134 queries storage (not shown) on server device 120 for previous test results of applications 122. For example, previous result 301A shown in FIG. 3A, previous result 301B shown in FIG. 3B, and previous result 301C shown in FIG. 3C are retrieved.

Figure 3D:
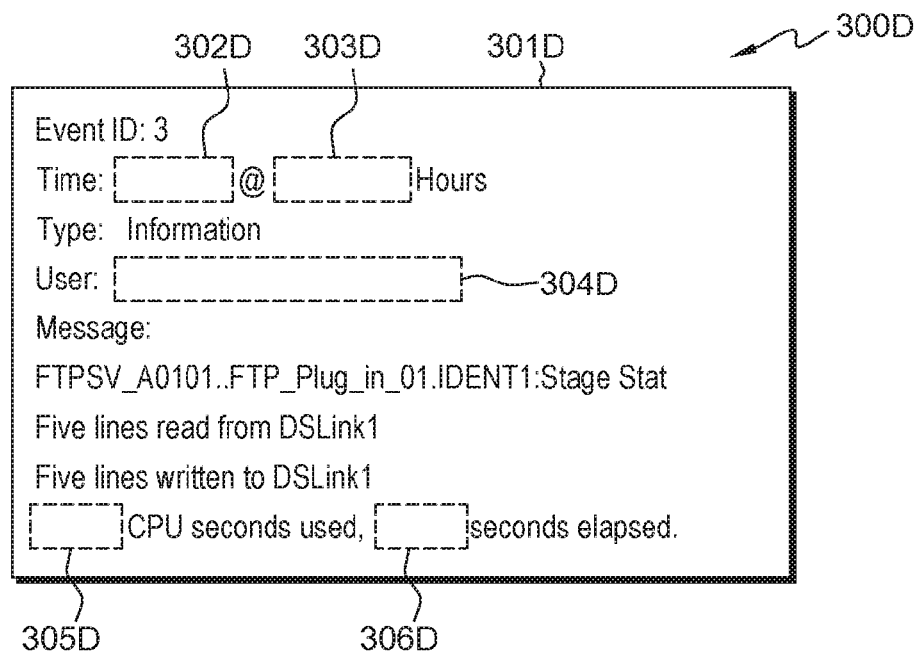
FIG. 3D is an example of an expected test result after applying the longest common subsequence to the previous, actual test results, in FIG. 3A, FIG. 3B, and FIG. 3C, in accordance with an embodiment of the present invention.

In an embodiment, creation program 134 determines the LCS or longest common subsequence (step 204). In other words, creation program 134 determines the LCS for the retrieved previous test results of the given application. The LCS is the longest subsequence common to all sequences in a set of sequences and in the same order in each sequence. In other words, the LCS for groups A and B is the longest group of elements from A and B that are common between the two groups and in the same order in each group. For example, the sequences "12354" and "1224533324" have an LCS of "1234". In an embodiment, it may be sufficient to only verify the common items when the software specification requirements have not changed and when actual test results have been previously verified at least one time. In one embodiment, creation program 134 determines the LCS for three test results from testing applications 122. For example, the uncommon data in FIG. 3A, FIG. 3B, and FIG. 3C is as follows: FIG. 3A, previous result 301A—date 302A, time 303A, user 304A, time 305A, and time 306A; FIG. 3B, previous result 301B—date 302B, time 303B, user 304B, time 305B, and time 306B; and FIG. 3C, previous result 301C—date 302C, time 303C, user 304C, time 305C, and time 306C. Eliminating the previously described uncommon data results in only common data between previous results 301A, previous results 301B, and previous results 301C remaining as shown in FIG. 3D where blank fields are shown for date 302D, time 303D, user 304D, time 305D, and time 306D.

In an embodiment, creation program 134 classifies data (step 206). In other words, creation program 134 classifies the data in the previous actual results by grouping common data types. Dynamic programming is used to determine the "matched" portions of the data. "Unmatched" portions of the data are then data that may be classified. For example, in the two phrases "My name is John" and "My name is Jane", the portion "My name is" is matched between the two while "John" and "Jane" are unmatched. Consequently, "John" and "Jane" may be classified. Dynamic programming is a method for solving a complex problem by reducing the problem into a group of less complex sub-problems. According to an embodiment of the present invention, creation program 134 extracts and groups the common data types from the previous actual results stored to server device 120. For example, date 302A, date 302B, and date 302C may be considered "matched" and are displayed in a common date format known in the art and therefore may be classified. Similarly, time 303A, time 305A, time 306A, time 303B, time 305B, time 306B, and time 303C, time 305C, time 306C may be classified.

In an embodiment, creation program 134 determines whether a group of common data belongs to an existing class (decision step 208). In this context, a class for a group of data may be a "date" or a "time stamp". In one embodiment, creation program 134 determines that the group of data does not belong to an existing class (decision step 208, NO branch) and creation program 134 attempts to create a new class (step 210). In another embodiment, creation program 134 determines that the group of data does belong to an existing class (decision step 208, YES branch) and creation program 134 applies the class to the data (step 212).

In an embodiment, creation program 134 creates a new class (step 210). In other words, creation program 134 previously determined that a group of data did not belong to an existing class (decision step 208, NO branch) and creation program 134 attempts to create a new class for the group of data. In an embodiment, if a group of data does not belong to an existing class, the data may be defined as a new class. In another embodiment, if data is registered in a pre-defined dictionary (e.g., a names dictionary, an address dictionary, etc.), the data may be saved as a new pattern in the dictionary. In yet another embodiment, if the data is not registered in a pre-defined dictionary, the data may be saved as an enumerated type, which is a data type consisting of data which does not belong to an existing class and is not registered in a predefined dictionary. In yet another embodiment, if a class cannot be created for some of the data, that data is classified as an enumerated type. In one embodiment, creation program 134 creates a 'name' class. For example, while not identical, user 304A in FIG. 3A, user 304B in FIG. 3B, and user 304C in FIG. 3C are similar. Dynamic programming matches 'test technician' in the three fields. The portion that remains is a candidate for classification and the class is defined as $NAME$ as shown in user 304E of FIG. 3E.

Figure 3E:
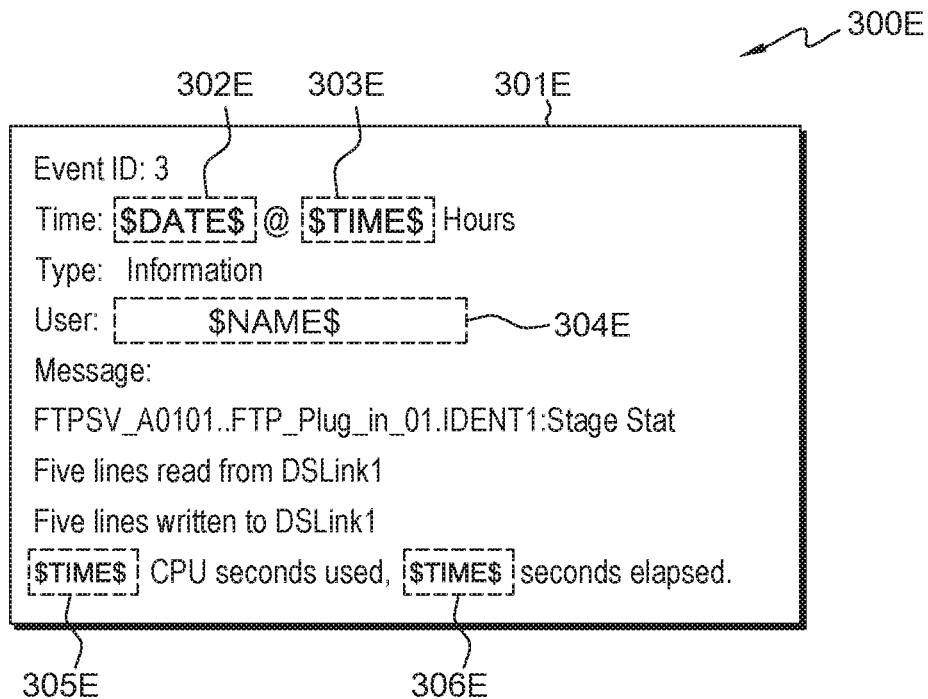
FIG. 3E is an example of an expected test result after classifying data in actual test results shown in FIG. 3A, FIG. 3B, and FIG. 3C, in accordance with an embodiment of the present invention.

In an embodiment, creation program 134 applies the classes to the data (step 212). In other words, creation program 134 applies both the existing and new classes to the previous actual test results data. All classified portions of the actual test results data may be ignored in future comparisons of the data. In an embodiment, possible classes include $DATE$, $NAME$, $TIME$, $HOSTNAME$, $IPADDRESS$, $PATH$, and the like. According to an embodiment of the present invention, creation program 134 classifies three groups of data in the previous actual test results: the 'date' the test was performed, the 'time stamp' for when the test started, and the 'name' of the test technician. For example, FIG. 3E shows the $DATE$ class in date 302E, the $NAME$ class in 304E, and the $TIME$ class in 303E, 305E, and 306E.

Figure 3F:
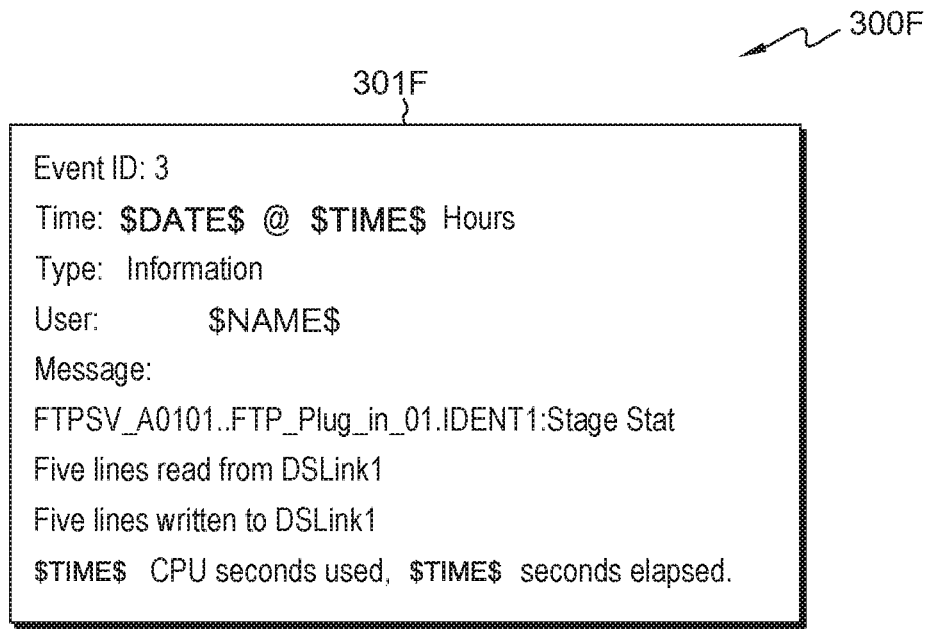
FIG. 3F is an example of an expected test result which incorporates data classification, in accordance with an embodiment of the present invention.

In an embodiment, creation program 134 creates expected test results (step 214). In other words, creation program 134 uses the previous actual results to create the expected test results for a software test. In an embodiment, the LCS is determined for the previous actual test results, uncommon data is removed, and classes are then applied to the previous actual test results. The resulting output is saved as the expected test results. In one embodiment, creation program 134 creates expected test results for a test of applications 122 stored to server device 120. For example, expected test result 301F shown in FIG. 3F is created.

Figure 3G:
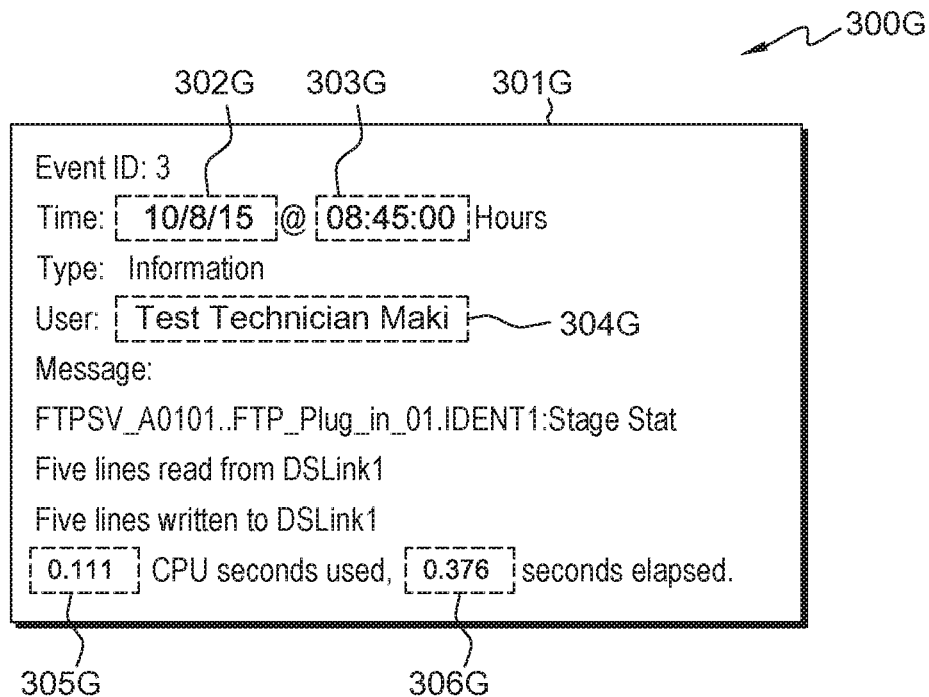
FIG. 3G is an example of a new, actual test result, in accordance with an embodiment of the present invention.

In an embodiment, creation program 134 retrieves the actual test result (step 216). In other words, creation program 134 retrieves the recent actual result of a software test for a given program. In an embodiment, software test results may be stored to a database repository (not shown) in server device 120 and/or computing device 130. According to an embodiment of the present invention, creation program 134 retrieves the actual test results from the software test of applications 122 stored to server device 120. For example, actual test result 301G shown in FIG. 3G is retrieved.

In an embodiment, creation program 134 classifies new data (step 218). In other words, creation program 134 classifies the data types common to both the created expected test results and the recent actual test results. In an embodiment, the classification may include a weighting of the frequency of occurrence of the values in comparison to previous actual results. For example, past results that include various, different time durations for a test may have those times classified as $NUMBER$ while numbers in the results that are the same (e.g., each line indicates 'five' lines of code, 'five' is not classified and would need verification. According to an embodiment of the present invention, creation program 134 classifies the common data types between the created expected test results and the recent actual test results which are both stored to server device 120. For example, the result of classifying the data is a result identical to expected test result 301F shown in FIG. 3F.

Figure 3H:
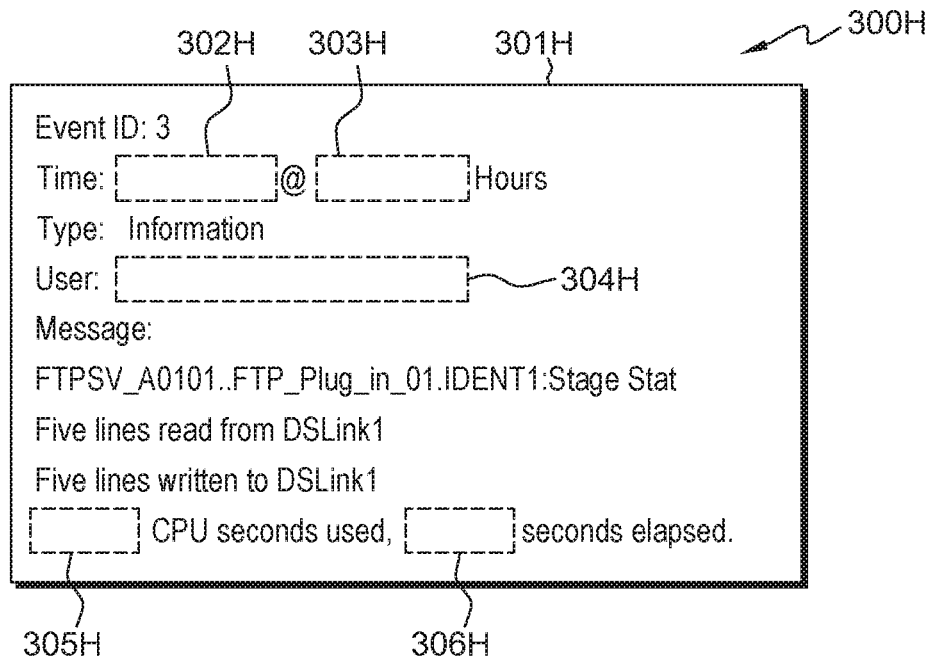
FIG. 3H is an example of an expected test result after determining the longest common subsequence between determined expected test results and recent actual test results and after removing data from the uncommon fields between them.

In an embodiment, creation program 134 determines the longest common subsequence (step 220). In other words, creation program 134 determines the LCS between the expected test results (created from the previous actual results) and the recent actual test results from the software test of a given program. In one embodiment, creation program 134 determines the LCS for the expected test results and the recent actual test results from the software test of applications 122. For example, expected test result 301H shown in FIG. 3H show the results after determining the LCS and data is removed from the uncommon fields 302H, 303H, 304H, 305H, and 306H.

In an embodiment, creation program 134 compares results (step 222). In other words, creation program 134 compares the created expected test results to the recent actual test results. In an embodiment, creation program 134 performs the comparison by comparing the expected test results created in step 214 and the actual test results after data is classified and the LCS is determined (step 220) and provides the comparison result to a user. In one embodiment, an indication may be sent to the user if the expected results and the actual test results are substantially different. In another embodiment, creation program 134 provides the created expected test results and the recent actual test results to a user who performs the comparison. For example, expected test result 301H is compared to recent actual test result 301G.

Figure 4:
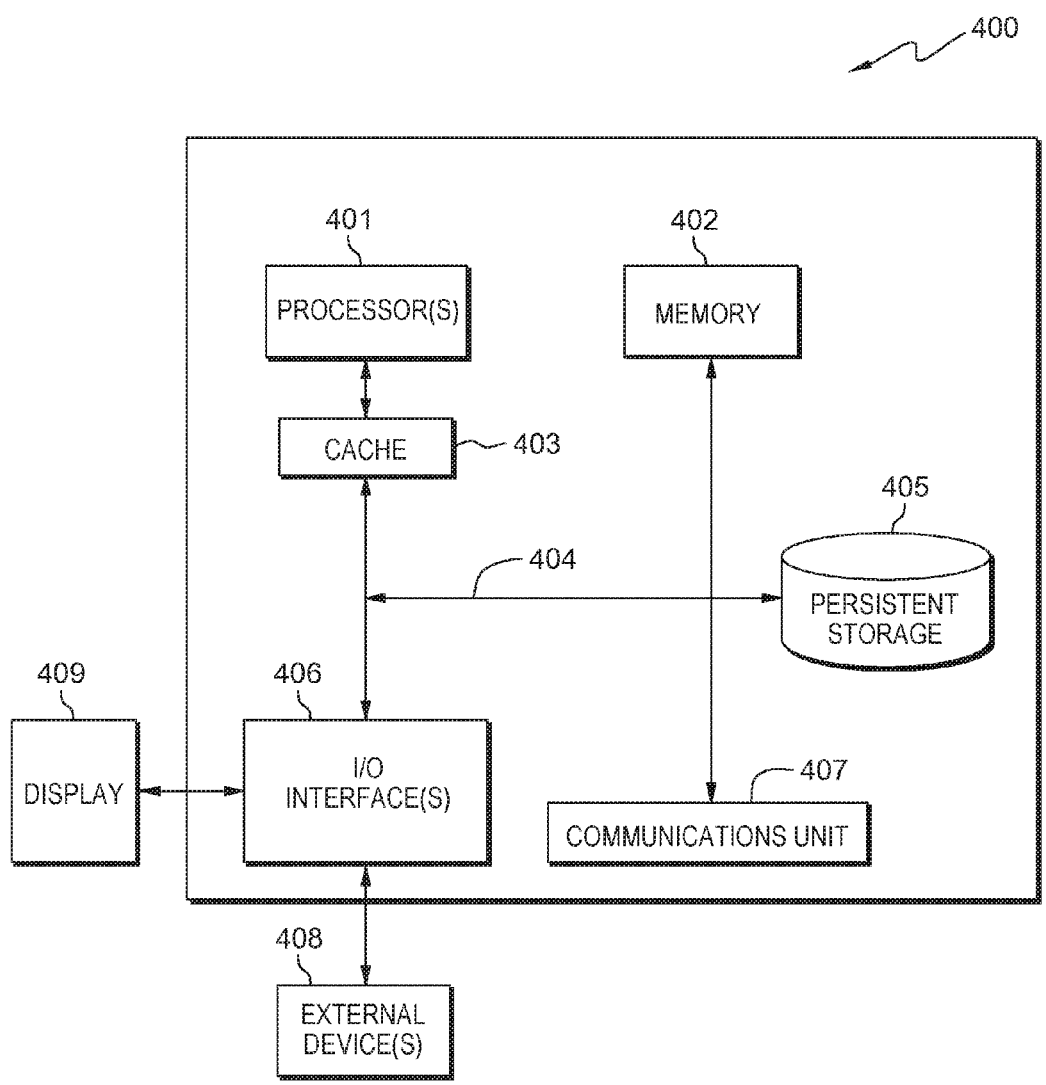
FIG. 4 depicts a block diagram of the components of the computing system of FIG. 1, in accordance with an embodiment of the present invention.

FIG. 4 depicts computer system 400 which is an example of a system that includes creation program 134. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for using previous test results to create expected test results for testing software, the method comprising:
retrieving, by one or more computer processors, one or more previous actual results from a software test;
determining, by one or more computer processors, a longest common subsequence of data of the one or more previous actual results;
removing, by one or more computer processors, the longest common subsequence of data from the one or more previous results to create a remaining common data;
responsive to removing the longest common subsequence of data from the one or more previous actual results, classifying, by one or more computer processors, the remaining common data in the one or more previous actual results into a matched portion and an unmatched portion, wherein classifying is done by dynamic programming and wherein matched portions are identical data in the remaining common data in each previous actual test result of the one or more previous actual results and wherein unmatched portions are different data in the remaining common data in each previous actual test result of the one or more previous actual results;
applying, by one or more computer processors, the unmatched portions of the remaining common data in the one or more previous actual results to an existing class;
creating, by one or more computer processors, at least one new class of data for the unmatched portions of the remaining common data in the one or more previous actual results which is not applied to an existing class;
applying, by one or more computer processors, the unmatched portions of data which is not applied to an existing class to the at least one new class; and
creating, by one or more computer processors, an expected result using the determined longest common subsequence of data of the one or more previous actual results, the matched portion of the remaining common data in the one or more previous actual results, and the classified remaining common data in the one or more previous actual results.

2. The method of claim 1, further comprising:
retrieving, by one or more computer processors, an actual test result, wherein the actual test result is more recent than the one or more previous actual results;
determining, by one or more computer processors, at least one data type common to both the created expected result and the actual test result;
determining, by one or more computer processors, the longest common subsequence between the expected result and the actual test result; and
comparing, by one or more computer processors, the expected result and the actual test result, wherein the comparison is done by classifying the at least one data type common to both the created expected result and the actual test result and the determined longest common subsequence between the expected result and the actual test result.

3. The method of claim 1, wherein the longest common subsequence is a set of characters, common to all subsequences in the one or more previous actual results, that appear in order of maximum length.

4. The method of claim 1, wherein dynamic programming is a method for solving a complex problem by reducing the problem into a group of less complex sub-problems.

5. The method of claim 1, wherein creating at least one new class of data uses one or more of the following: defining a new class if the data does not belong to an existing class, saving the data as a new pattern in a pre-defined dictionary, wherein the pre-defined dictionary is a name dictionary or an address dictionary, or saving the data as an enumerated data type, wherein the enumerated data type is a type of data that does not belong to an existing class and is not registered in the pre-defined dictionary.

6. The method of claim 2, wherein classifying the data types is done by weighting a frequency of occurrence of data values and wherein the data values that are the same are not classified and the data values that are different are classified.

7. The method of claim 2, further comprising:
responsive to comparing the expected result and the actual test result, sending, by one or more computer processors, an indication to a user if the expected result and the actual test result are different.

8. A computer program product for using previous test results to create expected test results for testing software, the computer program product comprising:
one or more computer readable storage media; and
program instructions stored on the one or more computer readable storage media, the program instructions comprising:
program instructions to retrieve one or more previous actual results from a software test;
program instructions to determine a longest common subsequence of data of the one or more previous actual results;
program instructions to remove the longest common subsequence of data from the one or more previous results to create a remaining common data;
responsive to removing the longest common subsequence of data from the one or more previous actual results, program instructions to classify the remaining common data in the one or more previous actual results into a matched portion and an unmatched portion, wherein classifying is done by dynamic programming and wherein matched portions are identical data in the remaining common data in each previous actual test result of the one or more previous actual results and wherein unmatched portions are different data in the remaining common data in each previous actual test result of the one or more previous actual results;
program instructions to apply the unmatched portions of the remaining common data in the one or more previous actual results to an existing class;
program instructions to create at least one new class of data for the unmatched portions of the remaining common data in the one or more previous actual results which is not applied to an existing class;
program instructions to apply the unmatched portions of data which is not applied to an existing class to the at least one new class; and
program instructions to create an expected result using the determined longest common subsequence of data of the one or more previous actual results, the matched portion of the remaining common data in the one or more previous actual results, and the classified remaining common data in the one or more previous actual results.

9. The computer program product of claim 8, further comprising program instructions stored on the one or more computer readable storage media, to:
retrieve an actual test result, wherein the actual test result is more recent than the one or more previous actual results;
determine the at least one data types common to both the created expected result and the actual test result;
determine the longest common subsequence between the expected result and the actual test result; and
compare the expected result and the actual test result, wherein the comparison is done by classifying the at least one data type common to both the created expected result and the actual test result and the determined longest common subsequence between the expected result and the actual test result.

10. The computer program product of claim 8, wherein the longest common subsequence is a set of characters, common to all subsequences in the one or more previous actual results that appear in order of maximum length.

11. The computer program product of claim 8, wherein dynamic programming is a method for solving a complex problem by reducing the problem into a group of less complex sub-problems.

12. The computer program product of claim 8, wherein creating at least one new class of data uses one or more of the following: defining a new class if the data does not belong to an existing class, saving the data as a new pattern in a pre-defined dictionary, wherein the pre-defined dictionary is a name dictionary or an address dictionary, or saving the data as an enumerated data type, wherein the enumerated data type is a type of data that does not belong to an existing class and is not registered in the pre-defined dictionary.

13. The computer program product of claim 9, wherein classifying the data types is done by weighting a frequency of occurrence of data values and wherein the data values that are the same are not classified and the data values that are different are classified.

14. The computer program product of claim 9, further comprising program instructions stored on the one or more computer readable storage media, to:
responsive to comparing the expected result and the actual test result, send an indication to a user if the expected result and the actual test result are different.

15. A computer system for using previous test results to create expected test results for testing software, the computer system comprising:
one or more computer processors;
one or more computer readable storage media; and
program instructions stored on the one or more computer readable storage media for execution by at least one of the one or more computer processors, the program instructions comprising:
program instructions to retrieve one or more previous actual results from a software test;
program instructions to determine a longest common subsequence of data of the one or more previous actual results;

program instructions to remove the longest common subsequence of data from the one or more previous results to create a remaining common data;

responsive to removing the longest common subsequence of data from the one or more previous actual results, program instructions to classify the remaining common data in the one or more previous actual results into a matched portion and an unmatched portion, wherein classifying is done by dynamic programming and wherein matched portions are identical data in the remaining common data in each previous actual test result of the one or more previous actual results and wherein unmatched portions are different data in the remaining common data in each previous actual test result of the one or more previous actual results;

program instructions to apply the unmatched portions of the remaining common data in the one or more previous actual results to an existing class;

program instructions to create at least one new class of data for the unmatched portions of the remaining common data in the one or more previous actual results which is not applied to an existing class;

program instructions to apply the unmatched portions of data which is not applied to an existing class to the at least one new class; and program instructions to create an expected result using the determined longest common subsequence of data of the one or more previous actual results, the matched portion of the remaining common data in the one or more previous actual results, and the classified remaining common data in the one or more previous actual results.

16. The computer system of claim 15, further comprising program instructions stored on the one or more computer readable storage media for execution by at least one of the one or more computer processors, to:

retrieve an actual test result, wherein the actual test result is more recent than the one or more previous actual results;

determine the at least one data types common to both the created expected result and the actual test result;

determine the longest common subsequence between the expected result and the actual test result; and compare the expected result and the actual test result, wherein the comparison is done by classifying the at least one data type common to both the created expected result and the actual test result and the determined longest common subsequence between the expected result and the actual test result.

17. The computer system of claim 15, wherein the longest common subsequence is a set of characters, common to all subsequences in the one or more previous actual results that appear in order of maximum length.

18. The computer system of claim 15, wherein dynamic programming is a method for solving a complex problem by reducing the problem into a group of less complex sub-problems.

19. The computer system of claim 16, wherein creating at least one new class of data uses one or more of the following: defining a new class if the data does not belong to an existing class, saving the data as a new pattern in a pre-defined dictionary, wherein the pre-defined dictionary is a name dictionary or an address dictionary, or saving the data as an enumerated data type, wherein the enumerated data type is a type of data that does not belong to an existing class and is not registered in the pre-defined dictionary.

20. The computer system of claim 16, wherein classifying the data types is done by weighting a frequency of occurrence of data values and wherein the data values that are the same are not classified and the data values that are different are classified.

* * * * *